Patented Sept. 1, 1953

2,650,906

UNITED STATES PATENT OFFICE 2,650,906

PREPARATION OF IMPREGNATED TYPE TUNGSTEN AND MOLYBDENUM CATALYSTS

Willem Frederik Engel and Han Hoog, Amsterdam, Netherlands, assignors to Shell Development Company, San Francisco, Calif., a corporation of Delaware No Drawing. Application March 28, 1950, Serial No. 152,512. In the Netherlands March 31, 1949

2 Claims. (Cl. 252—470)

This invention relates to an improved method for the preparation of catalysts having tungsten and/or molybdenum with cobalt and/or nickel promoters deposited by impregnation on the surface of a foraminous carrier material. More particularly, the invention relates to a method whereby various foraminous catalyst carrier materials may be impregnated with soluble compounds of the mentioned metals in a more advantageous and practical manner to produce active and desirable catalysts.

The metals tungsten and molybdenum and many of their compounds are known to catalyze a wide variety of reactions including, among others, hydrogenation, dehydrogenation, oxidation, desulfurization, isomerization and cracking. These metals and their catalytic compounds are, however, relatively costly. Also, they do not exist in forms having a stable and large surface area per unit weight. Consequently, it is usually the practice to use these catalytic materials in a diluted form in which the more costly and active catalytic agent is spread as a thin film on the surface of a foraminous support material which is usually of a lower order of activity and may be completely inactive catalytically.

While tungsten and molybdenum may be combined with various foraminous carrier materials in a number of ways, the preferred method is to impregnate the foraminous carrier materials with a soluble compound of the metal, e. g., ammonium tungstate and/or ammonium molybdate, and then to calcine the composite to convert the tungsten and/or molybdenum to the oxide. The oxide may then, if desired, be converted to a different catalytically active compound by known suitable treatment, e. g., sulfidation, halogenation, reduction, or the like. The catalysts prepared by this method are known to offer a greater exposed surface of the desired catalytic compound primarily because by this method of preparation the tungsten and/or molybdenum is more evenly distributed over the available surface of the foraminous carrier material. In methods where the metal compound is precipitated on the surface of the carrier material it is found that the catalytically active agent exists largely in the form of more or less isolated clumps or clusters of crystallites. The described preferred method of incorporating the tungsten and/or molybdenum by impregnation is excellent and presents no problem in the preparation of these specific catalysts. Also, other catalytic metals, e. g., Cr, Fe, Co, No, Zn, Cu, V, Ti, Pt, etc., may be incorporated by this method without difficulty.

It is also well known that tungsten and molybdenum exert a more desirable catalytic activity when used in combination with certain other catalytically active metals such in particular as cobalt and/or nickel. However, when it is tried to incorporate cobalt and/or nickel promoters with the tungsten and/or molybdenum by the usual impregnation method, difficulties are encountered since the metal compounds react in the impregnating solution to form insoluble crystalline precipitates. The precipitate is not able to penetrate into the fine pores of the foraminous carrier, and consequently the metal compounds are largely confined to the exterior macrosurface of the particles. If particles of catalyst prepared in this way are examined under a microscope it is seen that the exterior surface is coated by a layer of fine crystals. These crystals present only a relatively small surface; also, they are relatively loosely held and tend to dust off during normal handling of the catalyst. Therefore, when it is desired to impregnate these combinations of catalytic agents it is preferred to impregnate the foraminous carrier material with one component in the usual way, then dry and calcine the impregnated material, and then re-impregnate with the second component. This method also allows a certain amount of precipitation of the insoluble compound in the pores of the carrier material unless the material is well calcined between the impregnation steps to convert all of the first impregnated metal compound to the insoluble oxide. Also, there is a tendency for the second component to cover up the first component, rather than to be intimately associated with it.

It has now been found that the mentioned combination catalysts may be prepared more advantageously by impregnating the foraminous carrier material in a single step if an alkanolamine is incorporated in the impregnating solution. When an alkanolamine is incorporated in the impregnating solution, the formation of the undesired precipitate on the exterior surface of the catalyst is avoided and the described combinations of catalytic metals may be incorporated simultaneously in the most intimate and evenly extended mixture affording the optimum catalytic effect. A secondary advantage of the use of an alkanolamine-containing impregnating solution is that the concentrations of catalytic metals incorporated by a single impregnation may be materially increased.

The alkanolamines such as ethanolamine, propanolamine, butanolamine are suitable. The alkanolamines may be either a primary alkanol-amine such as monoethanolamine, a secondary amine such as diethanolamine, or a tertiary alkanolamine such as triethanolamine. These various alkanolamines are readily available and inexpensive and are preferred. However, other alkanolamines such as 1,2-dihydroxy-3-aminopropane which may be produced from epichlorhydrin and ammonia, or 1,2,3,4,5-pentahydroxy amino hexane, which may be produced from glucose by amination and reduction, can also be used. The amines which do not contain the hydroxyl group, i. e., ordinary amines, do not prevent the formation of the undesired precipitate; such amines are therefore not suitable for the preparation of these catalysts. The aromatic hydroxylamines are not used since they are known to be very strong reducing agents.

The minimum quantity of alkanolamine to be used is that which just prevents the undesired precipitation. This minimum amount cannot be explicitly stated since it depends upon the particular combination of metal compounds being used and upon the concentrations of the metal compounds. The minimum amount may be easily determined, however, in any given case by the following method. Solutions of the desired concentrations of e. g., ammonium molybdate, and e. g., cobalt nitrate, are made up and mixed in the desired proportions. Ten parts of the solution are measured into a series of test tubes containing 2, 3, 4, etc., parts of the desired alkanolamine. After mixing, the test tubes are allowed to stand. In those tubes where there is insufficient alkanolamine a fine crystalline precipitate is seen to gradually form. In those tubes containing sufficient alkanolamine no precipitate is formed even upon standing overnight. In general, there is a distinct difference in color in the solution when sufficient alkanolamine is present. When using cobalt nitrate, for example, the solution is normally of a reddish-orange color with insufficient alkanolamine, and of a wine color when sufficient alkanolamine is present. It is, however, not necessary to employ the minimum effective amount as an excess of the alkanolamine does no harm and the alkanolamine may be largely recovered and reused. For example, a 50% aqueous solution of the alkanolamine is recommended.

The method of the invention is applicable and advantageous in the preparation of impregnated molybdenum and/or tungsten catalyst with any foraminous catalyst carrier material. Examples of suitable carrier materials are for instance, silica gel, kaolin, magnesium silicate, magnesium carbonate, magnesium oxide, aluminum oxide, bauxite, asbestos, activated carbon. The method is particularly advantageous when the catalyst is prepared with a carrier material which is highly microporous, i. e., having pores which on the average are less than 100 microns in diameter. Silica gel, activated carbon, and activated alumina are examples of microporous carrier materials.

The impregnation of the carrier material with the desired metals may be advantageously carried out as follows:

1. Make up an aqueous solution of the alkanolamine, e. g., a 50% solution of triethanolamine;
2. Dissolve in the resultant solution the desired amount of the desired water-soluble compound of molybdenum and/or tungsten, e. g., to produce a 10% solution of ammonium tungstate;
3. Dissolve in water the desired salt of nickel and/or cobalt, e. g., a 10% solution of cobalt nitrate;
4. Add the solution from step 3 to that of step 2 with stirring;
5. Soak the particles of the foraminous carrier material in the resulting solution, drain and dry.

By this method the maximum concentration of molybdenum and/or tungsten may be incorporated properly on the surface of the foraminous carrier material in a single impregnation step. It is also possible, however, to vary this procedure. For example, all or a part of the alkanolamine may be added to the solution of nickel and/or cobalt. Also, the alkanolamine may be added after the water-soluble tungsten compound and/or molybdenum compound has been dissolved. However, in this case lower concentrations of the metal salts can only be applied. Also, the alkanolamine may be added after mixing the solutions of the two metals provided that this is done within a few minutes of mixing the solutions. If the alkanolamine is added after the mixed solutions have stood for awhile, a dense precipitate may be formed immediately.

After the solution of the two or more metals is made up it is used to impregnate the carrier material. An excess of the solution may be used in which case the excess solution may be drained from the impregnated carrier material or the excess solution may be evaporated from the impregnated carrier material. On the other hand, only such an amount of the solution may be applied as is taken up (absorbed) by the foraminous carrier material. In either case, the impregnated carrier material is then dried. The drying can be done in an oven, or in a kettle at atmospheric pressure, or under vacuum, and the liberated vapors of the water and alkanolamine can be collected and condensed. The dried material is then calcined, e. g., at 450° C. to convert the impregnated water-soluble metal compound to the oxidic form.

The impregnated catalyst may at any time after drying be ground and/or formed into pellets of any desired size or shape, and/or it may be treated by one of the conventional chemical methods to convert the impregnated mixture of the metals into any desired catalytically active compound such as the reduced metals, the sulfides, the chlorides, the phosphates, or the like. If desired, the impregnation treatment may be repeated at any stage after drying to incorporate further amounts of the metals.

The difficulty due to precipitation referred to above is encountered when preparing the impregnated catalyst with the combinations of tungsten with nickel, tungsten with cobalt and molybdenum with cobalt. Stangely enough it is not encountered in the case of the combination of molybdenum with nickel. In the case of the combination of molybdenum with iron the difficulty is encountered but it is not overcome by the method of the invention. On the other hand, in the case of the combination of tungsten with iron the difficulty does not exist and the method of the invention therefore is not required. The difficulty is also dependent somewhat upon the ratio upon the metals used. Thus, the tendency towards precipitation in the case of the combination of molybdenum and cobalt increases as the ratio of molybdenum to cobalt increases. The method is therefore particularly advantageous when preparing catalysts in which the cobalt or nickel is used in relatively small amounts to promote the molybdenum or tungsten, i. e., where the molybdenum or tungsten is in molecular excess.

*Example I*

A 50% aqueous solution of monoethanolamine is prepared. Ammonium tungstate is dissolved in this solution to give a 15% solution. A 10% solution of nickel nitrate is separately prepared. The nickel nitrate solution is added to the aqueous ethanolamine solution of ammonium tungstate. No precipitate forms. Granules of microporous alumina are soaked in this solution. After draining the excess solution, the impregnated granules are dried, ground, pressed into pellets and finally calcined at 450° C. for several hours to produce the oxidic catalyst.

If the ethanolamine is not used the maximum amount of ammonium tungstate which can be dissolved in the solution at room temperature is only about 4%. Also, upon adding the nickel nitrate solution the nickel and tungsten slowly react to form a precipitate which is presumably nickel tungstate.

*Example II*

When diethanolamine or triethanolamine is substituted for monoethanolamine in Example I no precipitate is formed.

*Example III*

When ethylamine or butylamine is substituted for the alkanolamine in Example I or II the formation of the precipitate is not prevented.

*Example IV*

When cobalt nitrate is substituted for nickel nitrate in Example I or II no precipitate is formed. However, if ethylamine or butylamine is substituted for the alkanolamine the precipitation takes place.

*Example V*

When ammonium molybdate is substituted for ammonium tungstate in Example I, precipitation does not take place even without the alkanolamine.

*Example VI*

When ammonium molybdate is substituted for ammonium tungstate in Example I no precipitate forms. However, if the alkanolamine is omitted or is substituted by ethylamine or butylamine the precipitation takes place.

*Example VII*

Two parts by volume of cobalt nitrate solution are added to 10 parts of a saturated aqueous solution of ammonium molybdate and then various additions are made as indicated with the results shown:

| Addition | Color | Results |
|---|---|---|
| None | Orange | Heavy precipitate. |
| 5 parts water | ----do---- | Do. |
| 10 parts water | ----do---- | Do. |
| 1 part $NH_4OH$ (10%) | ----do---- | Do. |
| 2 parts $NH_4OH$ (10%) | ----do---- | Do. |
| 3 parts $NH_4OH$ (10%) | ----do---- | Do. |
| 4 parts $NH_4OH$ (10%) | ----do---- | Do. |
| 5 parts $NH_4OH$ (10%) | ----do---- | Do. |
| 1 part HCl (1:1) | ----do---- | Do. |
| 1 part triethanolamine | ----do---- | Do. |
| 2 parts triethanolamine | ----do---- | Light precipitate. |
| 3 parts triethanolamine | ----do---- | Very light precipitate. |
| 4 parts triethanolamine | ----do---- | ----do---- |
| 5 parts triethanolamine | Wine | No precipitate. |
| 10 parts triethanolamine | ----do---- | Do. |

When 8–14 mesh granules of activated alumina (Alorco H–40 Alumina) are impregnated in the mixture with 5 or 10 parts of triethanolamine, the granules are evenly and properly impregnated. There is no evidence of crystals adhering to the macrosurface. When such granules are impregnated with the mixture without the added triethanolamine, however, the surface of the granules is seen upon microscopic examination to be covered with loosely adhering crystals.

We claim as our invention:

1. In the preparation of a catalyst containing a combination of elements selected from the group consisting of molybdenum and cobalt, tungsten and cobalt, tungsten and nickel, and mixtures thereof impregnated in a foraminous carrier material, the improvement which comprises impregnating the elements of said combination simultaneously in the said foraminous carrier material by means of an aqueous alkanolamine solution of water-soluble compounds of said elements which are converted to the corresponding oxides upon calcination, and calcining the thus impregnated foraminous carrier material to convert the said compounds to the corresponding metal oxides.

2. Process for the impregnation of a foraminous catalyst carrier material with a combination of elements selected from the group consisting of molybdenum and cobalt, tungsten and cobalt, tungsten and nickel, and mixtures thereof which comprises dissolving water-soluble compounds of each of the elements of said combination in an aqueous alkanolamine solution said water-soluble compounds being decomposable to the corresponding metal oxides by calcination, soaking the foraminous carrier material in the resultant solution and calcining the thus impregnated foraminous carrier material to convert the water-soluble salt to the corresponding metal oxides.

WILLEM FREDERIK ENGEL.
HAN HOOG.

References Cited in the file of this patent

UNITED STATES PATENTS

| Number | Name | Date |
|---|---|---|
| 2,034,077 | Arnold et al. | Mar. 17, 1936 |
| 2,486,361 | Nahin et al. | Oct. 25, 1949 |